(12) United States Patent
Wang et al.

(10) Patent No.: US 7,598,335 B2
(45) Date of Patent: Oct. 6, 2009

(54) FOLATE-RECEPTOR-TARGETING IRON OXIDE NANOPARTICLES COATED WITH POLY(ETHYLENE GLYCOL)

(75) Inventors: Yun-Ming Wang, Kaohsiung (TW); Kuei-Tang Lin, Kaohsiung (TW); Ting-Jung Chen, Tainan County (TW); Gin-Chung Liu, Kaohsiung (TW)

(73) Assignee: Kaohsiung Medical University, Kaohsiung (TW)

( * ) Notice: Subject to any disclaimer, the term of this patent is extended or adjusted under 35 U.S.C. 154(b) by 108 days.

(21) Appl. No.: 11/771,599

(22) Filed: Jun. 29, 2007

(65) Prior Publication Data

US 2008/0081891 A1   Apr. 3, 2008

(30) Foreign Application Priority Data

Aug. 1, 2006   (TW) .............................. 95128215 A (51) Int. Cl.
*C08G 77/00* (2006.01)
*A61B 5/055* (2006.01)

(52) U.S. Cl. ........................... 528/26; 528/28; 424/9.3; 424/9.323

(58) Field of Classification Search .................... 528/26
See application file for complete search history.

(56) References Cited

U.S. PATENT DOCUMENTS

2004/0249082 A1* 12/2004 Zhang et al. ................. 525/234
2006/0216239 A1* 9/2006 Zhang et al. ................ 424/9.34
2007/0269380 A1* 11/2007 Zhang et al. ................ 424/9.32

OTHER PUBLICATIONS

Sun et al. J. Am. Chem. Soc., 2002, 124, 8204-8205.*
Nathan Kohler et al., A Bifunctional Poly(ethylene glycol) Silane Immolbilized on Metallic Oxide-Based Nanoparticles for Conjugation with Cell Targeting Agents, J.Am. Chem. Soc. 2004, vol. 126, pp. 7206-7211.

* cited by examiner

*Primary Examiner*—Randy Gulakowski
*Assistant Examiner*—Robert Loewe
(74) *Attorney, Agent, or Firm*—Volpe and Koenig, P.C.

(57) ABSTRACT

The present invention provides the synthetic method and superparamagnetic iron oxide nanoparticles capable of targeting to the folic acid receptors existing on the cell membranes and with high relaxivity. The iron oxide nanoparticles of the present invention can further be used as the contrast agents for magnetic resonance imaging (MRI).

10 Claims, 12 Drawing Sheets
(1 of 12 Drawing Sheet(s) Filed in Color)

FOLATE-RECEPTOR-TARGETING IRON OXIDE NANOPARTICLES COATED WITH POLY(ETHYLENE GLYCOL)

FIELD OF THE INVENTION

The present invention relates to a contrast agent and the preparation thereof, more particularly to a contrast agent comprising superparamagnetic iron oxide particles and the preparation thereof.

BACKGROUND OF THE INVENTION

In order to provide more accurate diagnosis by means of medical images, the magnetic resonance imaging (MRI) technique is widely applied in the clinical diagnosis because it could provide the higher resolution and is unlike X-ray that causes the radiation damage. MRI is a phenomenon of the image contrast of the different relaxivities under the strong magnetic field, and the degree of the image contrast could be enhanced in the presence of the contrast agents.

According to the properties of the magnetic field, the contrast agents could be classified into two types. One is T1 contrast media that is designed to reduce the spin-lattice relaxation time (T1). This kind of T1 contrast agents enhances the strength of T1 signals, and the target tissue signal is thus strengthened (looks brighter in the MRI image). Up to the present time, there are several commercial T1 contrast agents that belong to T1 metal chelates, such as a $[Gd(DTPA)]^{2-}$ (diethylenetriaminepentaacetate-gadolinium(III)), a $[Gd(DOTA)]^{-}$ (1,4,7,10-tetraazacyclododecane-N,N',N'',N'''-tetraacetate-gadolinium (III)), a $[Gd(BOPTA)]^{2-}$ (benzyloxypropioic-diethylenetriamine pentaacetate-gadolinium(III)) and a MnDPDP(N,N'-dipyridoxylethylene diamine-N,N'-diacetate-5,5'-bis(phosphate)-manganese(II)).

The other one is T2 contrast media that is designed to reduce the spin-spin relaxation time (T2). This kind of T2 contrast media is a polymer of particulates that is usually named as superparamagnetic iron oxide (SPIO) nanoparticles and could cause the phenomena of the field inhomogenicity that further shortens the T2 relaxation time. Therefore, T2 contrast media can be used to reduce the target tissue signals so as to identify whether the tissue is normal (looks darker in the MRI image).

The curative effect of the T1 contrast agents is limited to the area within blood vessels, and thus its application is rather narrower. Nevertheless, the application of the T2 contrast agents can be broadened to the peripheral area of the blood capillary. Therefore, the T2 contrast media having the SPIO particles is of the great applicable value, wherein the target-oriented magnetic contrast agents become an important subject for the researches in the magnetic image field.

However, the iron oxide nanoparticles easily tend to aggregate and absorb plasma proteins due to their higher surface areas. While these iron oxide nanoparticles are injected into human bodies, they will rapidly be eliminated by the mononuclear phagocytes system (MPS), removed from the blood and thus fail to arrive at the target tissue cells if the aggregation or absorption of the human macrophages is occurred. Therefore, in order to increase the half-life of those iron oxide nanoparticles circulating in the blood, a specific thin layer is needed to cover the surfaces thereof. Furthermore, the material of this thin layer should be of the higher biological compatibility, nonimmunogenity, nonantigenity and protein-resistance. After covered with the specific thin layer, the aggregation and the absorption of macrophages in the human body will be highly prevented, which reduces the numbers of those iron oxide nanoparticles to be engulfed by the mononuclear macrophage. Accordingly, those iron oxide nanoparticles could successfully arrive at the target tissue cells.

The current thin layer for covering the SPIO particles is commonly composed of dextrans or its derivatives. Poly(ethylene glycol) (PEG) is a hydrophilic residue of no charges and with low toxicity, which can be metabolized in the human body. In the recent decade, the biological compatibilities of many drugs are improved by attaching PEG compounds thereto, which might prevent the absorption of the proteins. Hence, a huge amount of PEG compounds is necessary for the modification of the surface of those iron oxide nanoparticles. However, the preparation of the current commercial PEG compounds, such as those comprising —NHS or —COOH groups in the market, should expend multiple complicated and synthetic steps to be more reactive. Correspondingly, the commercial prizes of these PEG compounds with modified functional groups are highly expensive.

There are several ways to internalize the iron oxide nanoparticles, such as the fluid phase endocytosis, the receptor-mediated endocytosis and the phagocytosis. Through the mechanism of the receptor-mediated endocytosis, the iron oxide nanoparticles can be designed to be cell-specific by providing a probe on the surface thereof that target to the specific cell membranes. Despite the magnetic contrast media of iron oxide nanoparticles have the great potential for different applications, there are only Resovist®, Feridex®, Endorem™, GastroMARK® and Lumirem® that has acquired the FDA permission to practically apply in the image diagnosis. Furthermore, the mentioned contrast agents are all designed to target to the normal cells. If the probe on the surface of SPIO particles could be designed to target to the damaged cells, the application of SPIO particles could be further broadened.

Folic acid (FA) is a soluble vitamin B and also a key precursor for the synthesis of DNA and RNA. The normal cell membranes have a specific amount of receptors for coupling to the FA; the tumor cell membranes, however, will overexpress the FA receptors whose amount is several times than those of the normal cell membranes. Therefore, if the SPIO particles are designed to target to the FA receptors, they could be applied in the diagnosis for positioning the tumor cells and the further treatment.

In J. Am. Chem. Soc. Vol. 126, P7206 (2004), M. Zhang et al. disclosed that the PEG compounds with the average molecular weight of 600 Daltons was provided to cover the surface of iron oxide nanoparticles. Through the identification of the FT-IR spectrometer, it was proved that the surface of the iron oxide nanoparticles is modified with PEG and FA. But the synthesis of the PEG compounds that are used to modify iron oxide nanoparticles still takes the complicated and the expensive procedures as well as there needs a kind of contrast agents capable of targeting the specific tissue cell membranes in the medical-image diagnosis.

In order to overcome the drawbacks in the prior art, a SPIO-PEG-FA compound capable of concisely identifying the position of those tumor cells through the magnetic resonance image is provided. The particular design in the present invention not only solves the problems described above, but also is easy to be implemented. Thus, the invention has the utility for the industry.

SUMMARY OF THE INVENTION

In accordance with one aspect of the present invention, an iron oxide nanoparticle is provided. The iron oxide nanoparticle is the compound of a formula of X—$Y_n$-Z, wherein X represents a superparamagnetic iron oxide nanoparticle, Y represents a polyethylene glycol, Z represents a folic acid and n represents a number of the polyethylene glycol polymerized.

Preferably, X is modified by an alkoxysilane.

Preferably, the alkoxysilane is a 3-(aminopropyl)triethoxy silane.

Preferably, n is ranged from 8 to 25.

Preferably, the superparamagnetic iron oxide has a diameter ranged from 3 to 5 nm.

In accordance with another aspect of the present invention, a method for preparing a magnetic particle is provided. The method comprises the steps of: (1) providing a superparamagnetic iron oxide nanoparticle, a folic acid and a polyethylene glycol; (2) modifying the polyethylene glycol to obtain a modified polyethylene glycol; (3) coupling the superparamagnetic iron oxide particle with the modified polyethylene glycol to obtain a coupled compound; and (4) coupling the coupled compound with the folic acid to obtain a magnetic particle.

Preferably, the superparamagnetic iron oxide particle is prepared from reacting an iron oxide with a sodium oleate.

Preferably, the step (1) further comprises a step (1-1) of: forming an alkoxysilane on the surface of the superparamagnetic iron oxide particle.

Preferably, the alkoxysilane is a 3-(aminopropyl)triethoxy silane.

Preferably, the step (2) is performed by reacting a polyethylene Glycol with a triethylamine and a toluene-4-sulfulenyl chloride.

Preferably, the polyethylene glycol has an average molecular weight of 400 Daltons.

Preferably, the polyethylene glycol has an average molecular weight of 1000 Daltons.

Preferably, the polyethylene glycol has an average molecular weight of 2000 Daltons.

Preferably, the folic acid is a modified folic acid being modified by a 1-ethyl-3-(3-dimethylaminopropyl)-carbodiimide and a N'-hydroxy succinimide.

Preferably, the modified polyethylene glycol is a toluene-4-sulfulenyl polyethylene glycol.

In accordance with a further aspect of the present invention, a magnetic particle produced by the mentioned method is also provided.

Preferably, the magnetic particle is used as a contrast agent for magnetic resonance imaging.

The above aspects and advantages of the present invention will become more readily apparent to those ordinarily skilled in the art after reviewing the following detailed descriptions and accompanying drawings, in which:

BRIEF DESCRIPTION OF THE DRAWINGS

The patent or application file contains at least one drawing and at least one photograph executed in color. Copies of this patent or patent application publication with color drawing(s) and photograph(s) will be provided by the Office upon request and payment of the necessary fee.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
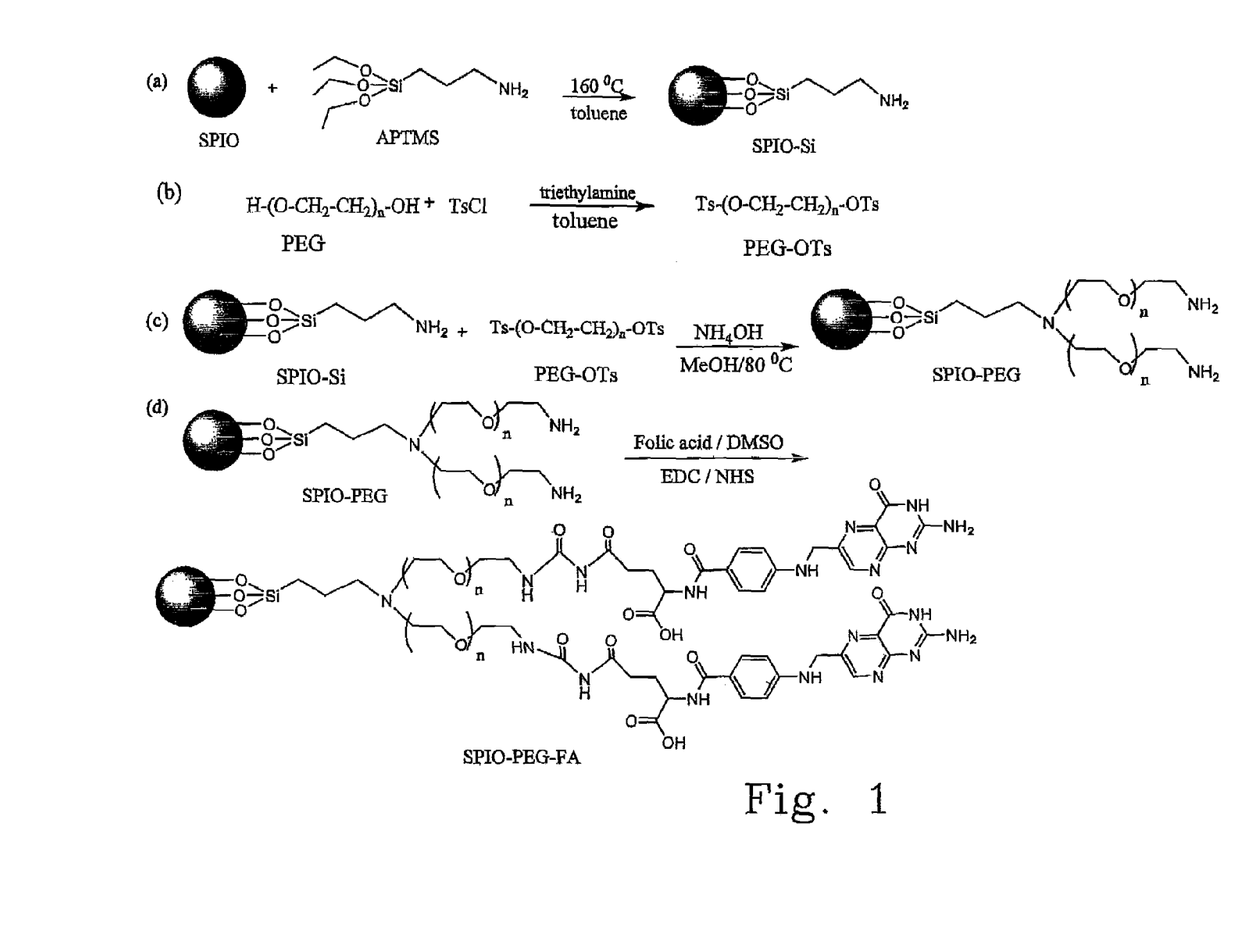
FIG. 1 is a schematic flowchart of the process for preparing the compound of the present invention.

FIG. 1 depicts a schematic diagram of the process for preparing the compounds of the present invention, and it will be described in detail as hereinafter.

As illustrated in the step (a) of FIG. 1, the process for preparing the superparamagnetic iron oxide (SPIO) nanoparticles is performed by the following steps. Dissolve 5.2 g (31.43 mmole) of $FeCl_3$ and 3.12 g (15.42 mmole) of $FeCl_2.4H_2O$ in 25 ml (0.4M) of the hydrogen chloride solution. After a vigorous agitation, the resultant solution is slowly dropped into 250 ml (2.5M) of the sodium hydroxide (NaOH) solution which is then continuously stirring for one hour. Followed by a centrifugation at 4000 rpm for 10 minutes, a black solid is obtained. Redisperse the black solid with the deionized water, and centrifuge the black solid at 4000 rpm for 10 minutes, followed by repeating the same step five times to remove the remaining NaOH solution. Further, redisperse the black solid with the deionized water and add an oleic acid thereinto for a further agitation, followed by extracting the resultant solution with a toluene solution, so that a black liquid comprising the SPIO nanoparticles is obtained. The FT-IR of the mentioned SPIO nanoparticles is respectively at 3399.0 $cm^{-1}$ and 1636.7 $cm^{-1}$. Subsequently, dissolve 0.1 g of SPIO nanoparticles in 200 ml of the toluene solution, heat the resultant solution up to 95° C. in the presence of $N_2$, and continuously stir the solution for 30 minutes, followed by adding 1 ml (4.29 mmole) of 3-aminopropyl)trimethoxy silane (APTMS) thereinto. Reflux the resultant solution at 160° C. for six hours to obtain the SPIO nanoparticles covered with the silane (hereinafter named as SPIO-Si) as illustrated in the step (a) of FIG. 1.

The present invention provides the PEG compounds with three different molecular weights as the preferred embodiments. As illustrated in the step (b) of FIG. 1, the average molecular weight (Mn) of PEG in a first embodiment of the present invention is 400 Dalton (hereinafter named as PEG (400)). Dissolve 12.3 g (62.5 mmole) of toluene-4-sulfulenyl chloride (TsCl) in 200 ml of the toluene solution to give a solution A. Dissolve 10 g (25 mmole) of PEG(400) and 9.53 ml (68.75 mmole) of triethylamine (TEA) in 50 ml of the toluene solution for a vigorous agitation to give a solution B. Then, slowly add the solution B into the solution A, and the reaction is continued for 24 hours at the room temperature. Subsequently, extract the resultant solution with $H_2O$/toluene and condense the toluene layer by means of the vacuum condenser, followed by washing the remaining TsCl with hexane and being dried by a vacuum system. Accordingly, 16.72 g (23.6 mmole) of toluene-4-sulfulenyl PEG(400) (PEG(400)-OTs) is obtained and the yield could be achieved to 94.41%.

$^1$H-NMR (400 MHz, $CDCl_3$) of $PEG_{(400)}$-OTs are provided as below: δ (ppm): 2.445 (s, 6H, —$C_6H_4$—$CH_3$), 3.577-3.692 (m, 32H, —($CH_2$—O—$CH_2$)$_n$—), 4.142, 4.154, 4.166 (t, 4H, —$OCH_2$—$CH_2$—$SO_2$—), 7.338, 7.358, 7.781 and 7.801 (dd, 8H, —$C_6H_4$—). $^{13}$C-NMR (100 MHz, $CDCl_3$) of $PEG_{(400)}$-OTs are provided as below: δ (ppm): 144.639, 132.696, 129.642, 127.733, 70.460, 70.332, 70.279, 70.241, 69.104, 68.407 and 21.433.

As illustrated in the step (b) of FIG. 1, the average molecular weight (Mn) of PEG in a second embodiment of the present invention is 1000 Dalton (hereinafter named as PEG (1000)). Dissolve 12.3 g (62.5 mmole) of TsCl in 250 ml of the toluene solution, and add 25 g (25 mmole) of PEG(1000) and 9.53 ml (68.75 mmole) of TEA into the resultant solution where the reaction is continued for 48 hours at the room temperature. Subsequently, filter the resultant solution and extract the filtered solution with $H_2O$/toluene. Condense the water layer by means of the vacuum condenser, and dissolve the resultant condensate in a chloroform ($CHCl_3$) solution, followed by performing a filtration. Further, condensate the filtered solution by means of the vacuum condenser. Accordingly, 30.7 g (23.5 mmole) of toluene-4-sulfulenyl PEG (1000) (PEG(1000)-OTs) is obtained and the yield could be achieved to 93.7%.

$^1$H-NMR (400 MHz, $CDCl_3$) of $PEG_{(1000)}$-OTs are provided as below: δ (ppm): 2.410 (s, 6H, —$C_6H_4$—$CH_3$), 3.539-3.655 (m, 108H, —($CH_2$—O—$CH_2$)$_n$—), 4.103, 4.115, 4.127 (t, 4H, —$OCH_2$—$CH_2$—$SO_2$—), 7.300, 7.320, 7.744, 7.764 (dd, 8H, —$C_6H_4$—). $^{13}$C-NMR (100 MHz, $CDCl_3$) of $PEG_{(1000)}$-OTs are provided as below: δ (ppm): 144.592, 132.836, 129.644, 127.764, 70.519, 70.398, 70.360, 70.307, 69.966, 69.071, 68.457 and 21.437.

As illustrated in the step (b) of FIG. 1, the average molecular Weight (Mn) of PEG in the third embodiment of the present invention is 2000 Dalton (hereinafter named as PEG (2000)). Dissolve 12.3 g (62.5 mmole) of TsCl in 250 ml of the toluene solution, and add 50 g (25 mmole) of PEG(2000) and 9.53 ml (68.75 mmole) of TEA into the resultant solution where the reaction is continued for 48 hours at the room temperature. Subsequently, filter the resultant solution and extract the filtered solution with H2O/toluene. Condense the water layer by means of the vacuum condenser, and dissolve the resultant condensate in a chloroform ($CHCl3$) solution, followed by performing a filtration. Further, condensate the filtered solution by means of the vacuum condenser. Accordingly, 53.5 g (23.2 mmole) of toluene-4-sulfulenyl PEG (1000) (PEG(1000)-OTs) is obtained and the yield could be achieved to is 93.6%.

$^1$H-NMR (400 MHz, $CDCl_3$) of $PEG_{(2000)}$-OTs are provided as below: δ (ppm): 2.453 (s, 6H, —$C_6H_4$—$CH_3$), 3.585-3.701 (m, 196H, —($CH_2$—O—$CH_2$)$_n$—), 4.148, 4.161, 4.173 (t, 4H, —$OCH_2$—$CH_2$—$SO_2$—), 7.339, 7.359, 7.791, 7.812 (dd, 8H, —$C_6H_4$—). $^{13}$C-NMR (100 MHz, $CDCl_3$) of $PEG_{(2000)}$-OTs are provided as below: δ (ppm): 144.729, 133.002, 129.773, 127.931, 70.693, 70.511, 70.231, 70.117, 69.185, 68.631 and 21.589.

As illustrated in the step (c) of FIG. 1, reduce the temperature of the SPIO-Si solution given in the step (a) to 80° C. Dissolve 3 g (4.2 mmole) of $PEG_{(400)}$-OTs in 50 ml of the toluene solution to give a solution A1. Add the solution A1 into the SPIO-Si solution for a further reaction for 20 hours at 80° C. Perform a centrifugation of the resultant solution at 4000 rpm and wash the excess APTMS and $PEG_{(400)}$-OTs with a toluene solution, followed by performing a further centrifugation to obtain a brown condensate. Then, disperse the brown condensate with a methanol solution, and add 4 ml of ammonia water thereinto for a 48-hours agitation, followed by adding the deionized water thereinto and removing the methanol. Subsequently, dialyze the resultant solution against the huge amount of the deionized water by means of dialysis membranes (SPETRUM, 12,000-14,000 out off) at least ten times, so as to remove the remaining salt. Accordingly, the intermediate product, SPIO-$PEG_{(400)}$, whose FT-IR are 3417.7 $cm^{-1}$, 3295.5 $cm^{-1}$, 2923.4 $cm^{-1}$, 2853.4 $cm^{-1}$, 1641.8 $cm^{-1}$, 1548.9 $cm^{-1}$, 1461.6 $cm^{-1}$, 1351.5 $cm^{-1}$, 1120.4 $cm^{-1}$ and 929.7 $cm^{-1}$, is obtained.

As illustrated in the step (c) of FIG. 1, reduce the temperature of the SPIO-Si solution given in the step (a) to 80° C. Dissolve 6 g (4.6 mmole) of $PEG_{(1000)}$-OTs in 50 ml of the toluene solution to give a solution A2. Add the solution A2 into the SPIO-Si solution for a further reaction for 20 hours at 80° C. Perform a centrifugation of the resultant solution at 4000 rpm for 10 minutes and wash the excess APTMS and $PEG_{(400)}$-OTs with a toluene solution, followed by performing a further centrifugation to obtain a brown condensate. Then, disperse the brown condensate with a methanol solution, and add 4 ml of ammonia water thereinto for a 48-hours agitation, followed by adding the deionized water thereinto and removing the methanol. Subsequently, dialyze the resultant solution against the huge amount of the deioinized water by means of dialysis membranes (SPETRUM, 12,000-14,000 out off) at least ten times, so as to remove the remaining salt. Accordingly, the intermediate product, SPIO-$PEG_{(1000)}$, whose FT-IR are 3425.7 $cm^{-1}$, 3298.8 $cm^{-1}$, 2923.9 $cm^{-1}$, 2853.9 $cm^{-1}$, 1642.0 $cm^{-1}$, 1546.3 $cm^{-1}$, 1490.0 $cm^{-1}$, 1351.3 $cm^{-1}$, 1106.3 $cm^{-1}$ and 949.3 $cm^{-1}$, is obtained.

As illustrated in the step (c) of FIG. 1, reduce the temperature of the SPIO-Si solution given in the step (a) to 80° C. Dissolve 9 g (3.9 mmole) of $PEG_{(2000)}$-OTs in 50 ml of the toluene solution to give a solution A3. Add the solution A3 into the SPIO-Si solution for a further reaction for 20 hours at 80° C. Perform a centrifugation of the resultant solution at 4000 rpm for 10 minutes and wash the excess APTMS and $PEG_{(2000)}$-OTs with a toluene solution, followed by performing a further centrifugation to obtain a brown condensate. Then, disperse the brown condensate with a methanol solution, and add 4 ml of ammonia water thereinto for a 48-hours agitation, followed by adding the deionized water thereinto and removing the methanol. Subsequently, dialyze the resultant solution against the huge amount of the deionized water by means of dialysis membranes (SPETRUM, 12,000-14,000 out off) at least ten times, so as to remove the remaining salt. Accordingly, the intermediate product, SPIO-PEG$_{(2000)}$, whose FT-IR are 3426.9 cm$^{-1}$, 3284.1 cm$^{-1}$, 2921.6 cm$^{-1}$, 2855.1 cm$^{-1}$, 1641.9 cm$^{-1}$, 1462.5 cm$^{-1}$, 1351.5 cm$^{-1}$, 1104.6 cm$^{-1}$ and 950.7 cm$^{-1}$, is obtained.

As illustrated in the step (d) of FIG. 1, dissolve 0.002 g (4.8 μmole) of FA in 5 ml of a dimethyl sulfoxide (DMSO) solution, and then add 0.036 g (0.23 mmole) of EDC and 0.026 (0.023 mmole) of NHS to the mentioned solution for a further agitation of 30-minutes. Then, mix the mentioned solution with 5 ml (10.8 mM) of the SPIO-PEG$_{(400)}$ for a agitation of about 48 hours at the room temperature. Furthermore, perform a dialysis of the resultant solution against a huge amount of the deionized water at least ten times by means of dialysis membranes (SPETRUM, 12,000-14,000 out off) to completely remove the remaining salt. Accordingly, the final product, SPIO-PEG$_{(400)}$-FA, is obtained. The FT-IR of the SPIO-PEG$_{(400)}$-FA is 3397.2 cm$^{-1}$, 2924.6 cm$^{-1}$, 2853.7 cm$^{-1}$, 1687.8 cm$^{-1}$, 1641.8 cm$^{-1}$, 1607.8 cm$^{-1}$ and 1106.0 cm$^{-1}$. The UV/Visible absorbance spectrum of the SPIO-PEG$_{(400)}$-FA is 360 nm, 280 nm and 200 nm.

As illustrated in the step (d) of FIG. 1, dissolve 0.002 g (4.8 μmole) of FA in 5 ml of a dimethyl sulfoxide (DMSO) solution, and add 0.036 g (0.23 mmole) of EDC and 0.026 (0.023 mmole) of NHS to the mentioned solution for the agitation of 30-minutes. Then, mix the mentioned solution with 5 ml (10.8 mM) of the SPIO-PEG$_{(1000)}$ for a further agitation of about 48 hours at the room temperature. Furthermore, perform a dialysis of the resultant solution against a huge amount of the deionized water at lest ten times by means of dialysis membranes (SPETRUM, 12,000-14,000 out off) to completely remove the remaining salt. Accordingly, the final product, SPIO-PEG$_{(1000)}$-FA, is obtained. The FT-IR of SPIO-PEG$_{(1000)}$-FA is 3395.6 cm$^{-1}$, 2924.4 cm$^{-1}$, 2853.8 cm$^{-1}$, 1686.6 cm$^{-1}$, 1608.9 cm$^{-1}$ and 1106.1 cm$^{-1}$. The UV/Visible absorbance spectrum of the SPIO-PEG$_{(1000)}$-FA is 360 nm, 280 nm and 200 nm.

As illustrated in the step (d) of FIG. 1, dissolve 0.002 g (4.8 μmole) of FA in 5 ml of a dimethyl sulfoxide (DMSO) solution, and then add 0.036 g (0.23 mmole) of EDC and 0.026 (0.023 mmole) of NHS to the mentioned solution for a further agitation of about 30 minutes. Then, mix the mentioned solution with 5 ml (10.8 mM) of the SPIO-PEG$_{(2000)}$ for a further agitation of about 48 hours at the room temperature. Furthermore, perform a dialysis of the resultant solution against a huge amount of the deionized water at lest ten times by means of dialysis membranes (SPETRUM, 12,000-14,000 out off) to completely remove the remaining salt. Accordingly, the final product, SPIO-PEG$_{(2000)}$-FA, is obtained. The FT-IR of SPIO-PEG$_{(2000)}$-FA are 3358.5 cm$^{-1}$, 2923.8 cm$^{-1}$, 2853.5 cm$^{-1}$, 1687.8 cm$^{-1}$, 1604.5 cm$^{-1}$, and 1100.0 cm$^{-1}$. The UV/Visible absorbance spectrum of SPIO-PEG$_{(2000)}$-FA are 360 nm, 280 nm and 200 nm.

Figure 2A:
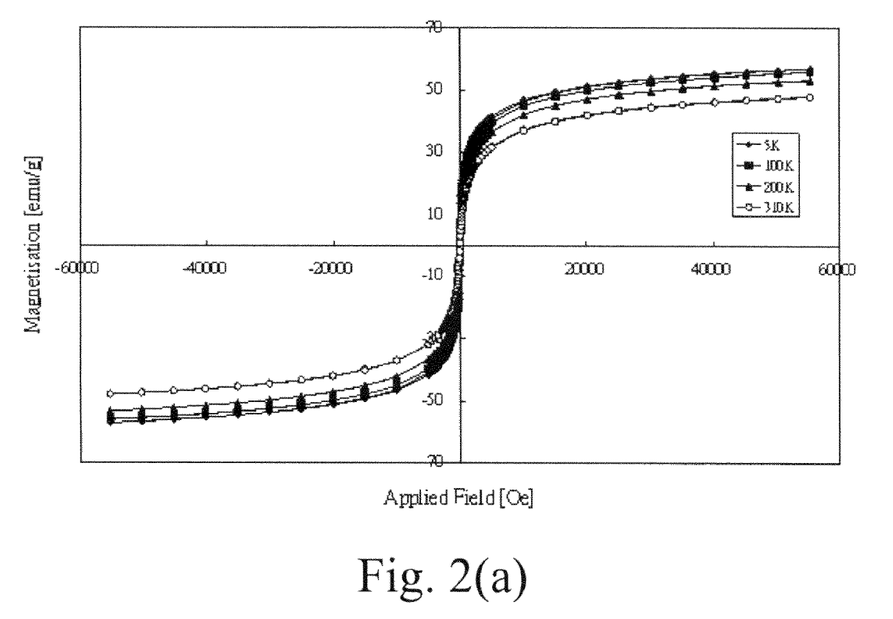
FIG. 2 is a relationship diagram of the induced magnetic field versus the applied electrical field of SPIO power particles measured by SQUID.
Figure 2B:
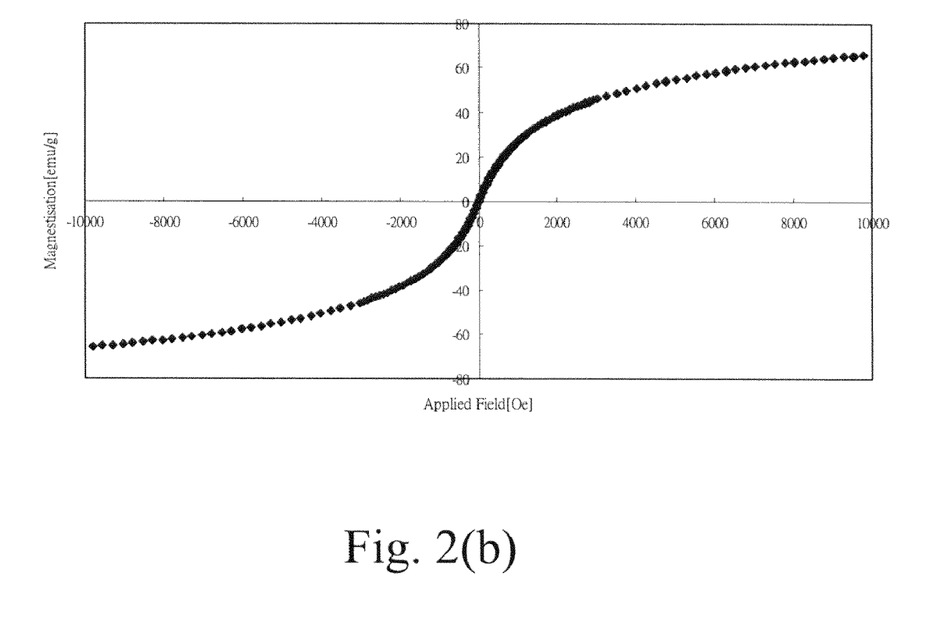

Please refer to FIG. 2, which depicts a relationship between the induced magnetic field and the applied electrical field of the SPIO power particles. Please refer to FIG. 2(*a*). There is no hysteresis curve while the present SIPO is at 310K since the induced magnetic field of SPIO disappears in the absence of the applied electrical field. It is proved that the magnetic property of the present SPIO is identified and the saturated magnetic susceptibility at 20000 Oe is 62 emu/g as illustrated in FIG. 2(*b*).

Figure 3:
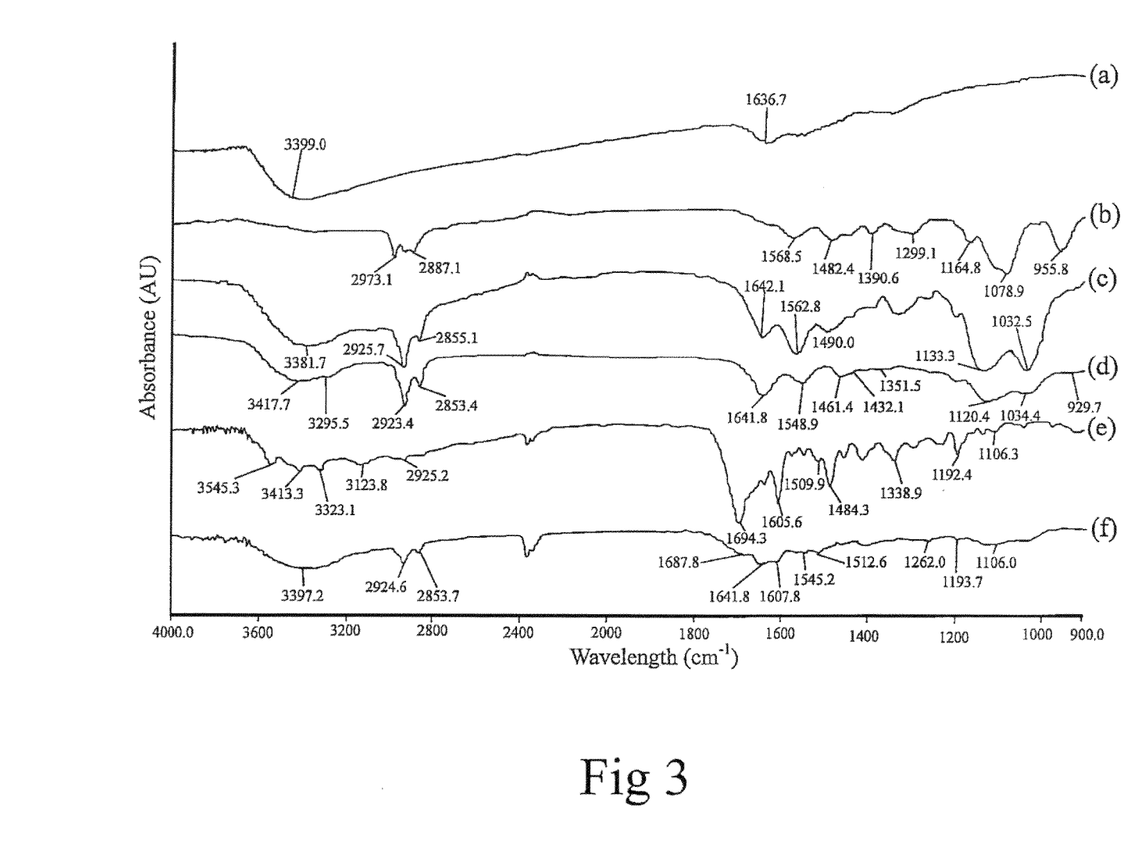
FIG. 3 is an infrared spectrum diagram of the compound $PEG_{(400)}$ according to a first embodiment of the present invention.

Please refer to FIG. 3, which depicts the infrared spectrum diagram of SPIO-PEG$_{(400)}$-FA of the present invention. As illustrated in FIG. 3, SPIO nanoparticle (a) has a signal of a hydroxyl group at 3399 cm$^{-1}$, which means the surface of the present SPIO nanoparticle has hydroxyl groups. APTMS (b) has the signals of low strength at 1300~1600 cm$^{-1}$ and has the signals of —CH$_2$— groups at 2887~2973 cm$^{-1}$. Accordingly, after the present SPIO nanoparticle is covered with the APTMS, SPIO-Si (c) is obtained as illustrated in FIG. 3 where the SPIO-Si has a signal at 3381 cm$^{-1}$ that is a combined signal of —NH$_2$ and —OH groups and has a signal of low strength at 1300~1600 cm$^{-1}$. It is demonstrated that the APTMS has been successfully modified the surface of the present SPIO nanoparticles. Then, the SPIO-Si continuously reacts with PEG$_{(400)}$ to form the SPIO-PEG$_{(400)}$ (d) as shown in FIG. 3. The SPIO-PEG$_{(400)}$ has two sets of signals, the respective —NH and —NH$_2$ groups, at 3417 cm$^{-1}$ and 3295 cm$^{-1}$ and also has absorption signals of C—O—C groups respectively at 1351.5 cm$^{-1}$ and 1120.4 cm$^{-1}$. Consequently, it is demonstrated that PEG has been successfully bonded on the surface of SPIO. The folic acid (e) has several sets of signals at 3000~3600 cm$^{-1}$ and between 1100~1700 cm$^{-1}$, wherein two signals respectively at 1605 cm$^{-1}$ and 1694 cm$^{-1}$ are the representative ones. Accordingly, SPIO-PEG$_{(400)}$-FA (f) has an absorption signal of at 3100~3600 cm$^{-1}$ and also has the absorption signals of the folic acid respectively at 1607 cm$^{-1}$ and 1687 cm$^{-1}$. Therefore, through Fourier-transform infrared (FT-IR) spectrometer to detect the absorption signals of different samples, it is demonstrated that the folic acid has been successfully bonded to the SPIO-PEG$_{(400)}$.

Figure 4:
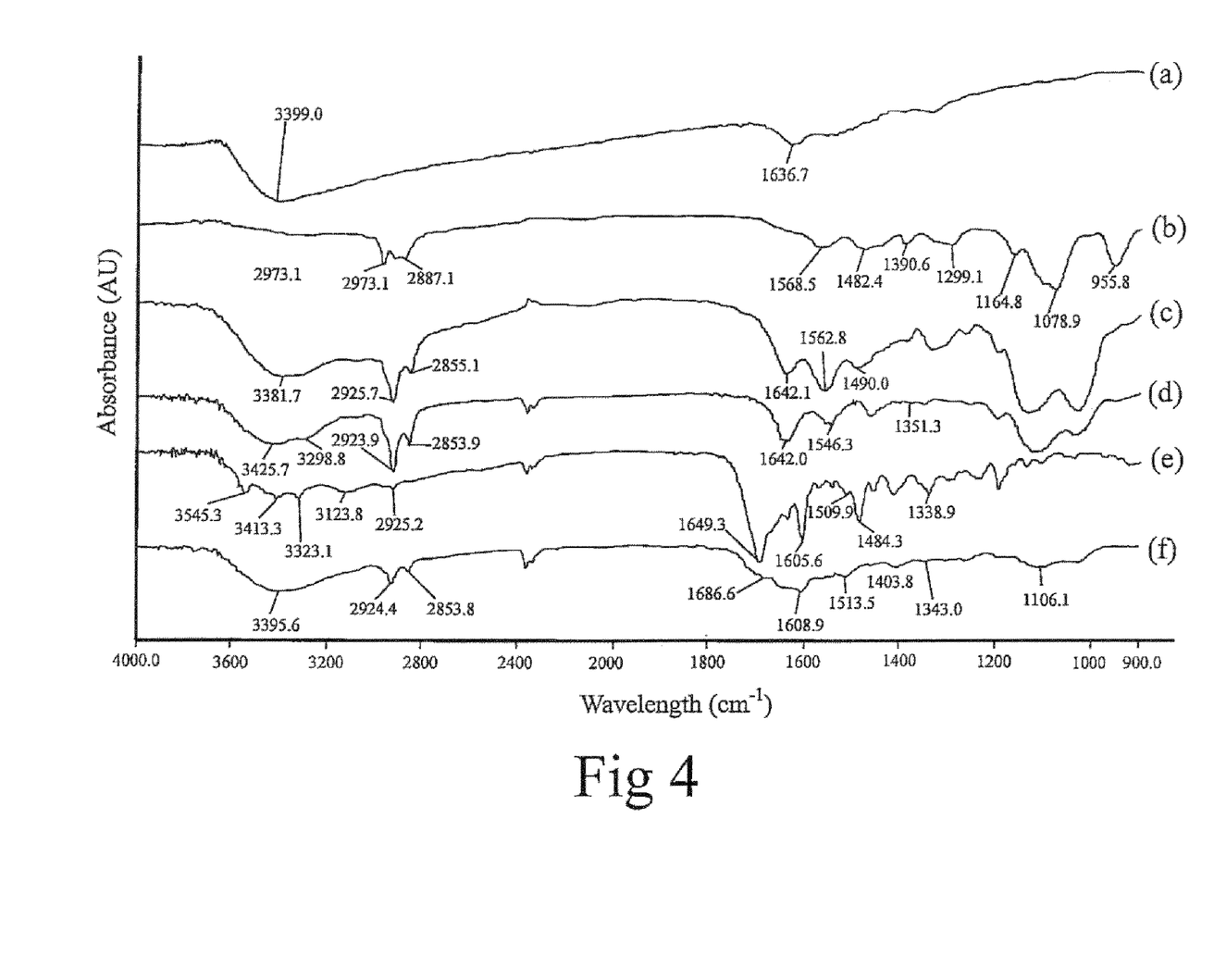
FIG. 4 is an infrared spectrum diagram of the compound $PEG_{(1000)}$ according to a second embodiment of the present invention.

Please refer to FIG. 4, which depicts the infrared spectrum diagram of SPIO-PEG$_{(1000)}$-FA of the present invention. It is known that the result of the illustration in FIG. 4 is similar to that of FIG. 3; hence, it is demonstrated that PEG$_{(1000)}$ has been successfully bonded to the surface of SPIO and the bonded PEG$_{(1000)}$ is further modified by coupling to the folic acid to form the SPIO-PEG$_{(1000)}$-FA.

Figure 5:
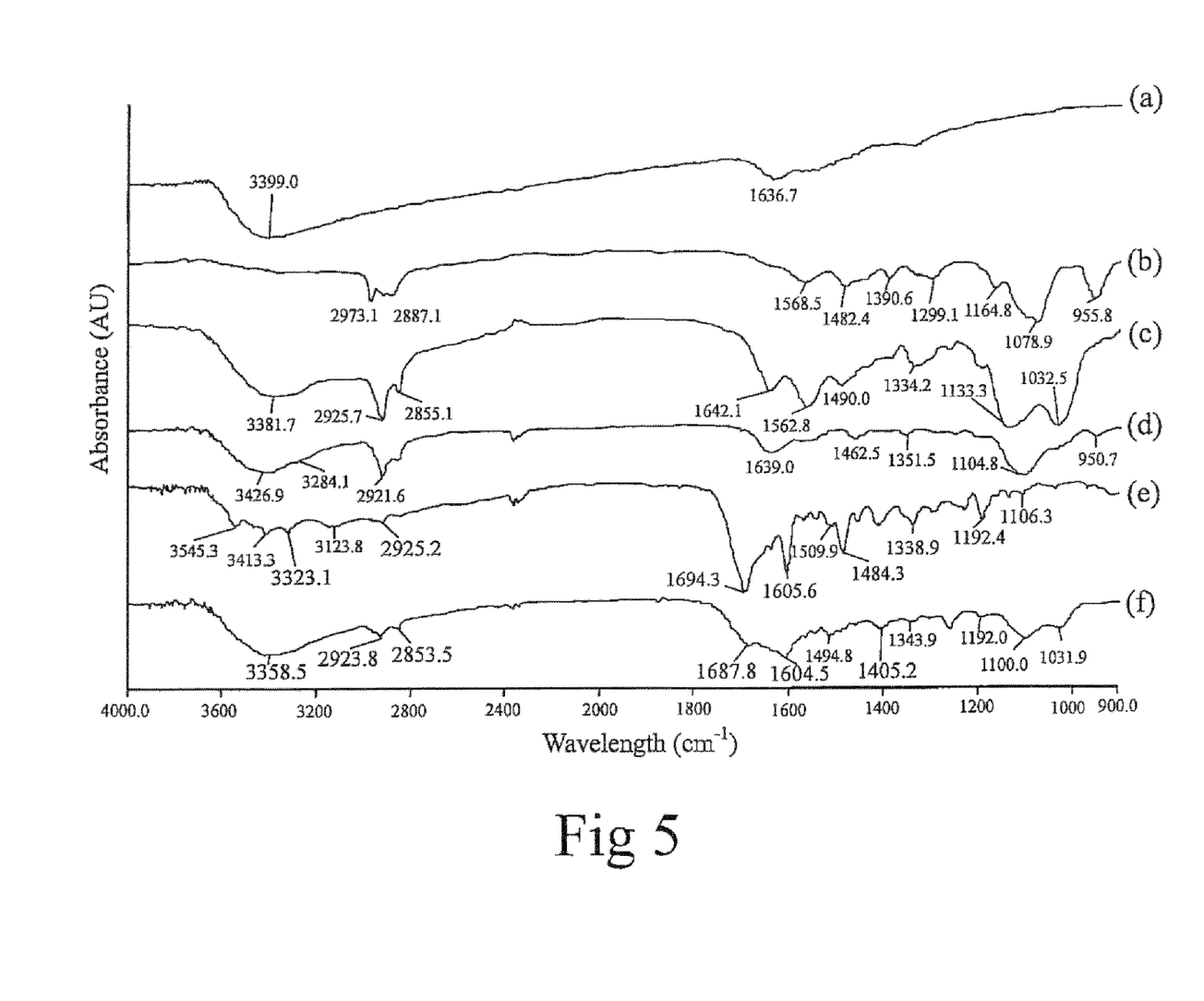
FIG. 5 is an infrared spectrum diagram of the compound $PEG_{(2000)}$ according to a third embodiment of the present invention.

Please refer to FIG. 5, which depicts the infrared spectrum diagram of SPIO-PEG$_{(2000)}$-FA of the present invention. It is known that the result of the illustration in FIG. 4 is similar to that of FIG. 3; hence, it is demonstrated that PEG$_{(2000)}$ has been successfully bonded to the surface of SPIO and the bonded PEG$_{(2000)}$ is further modified by coupling to the folic acid to form the SPIO-PEG$_{(2000)}$-FA.

Figure 6:
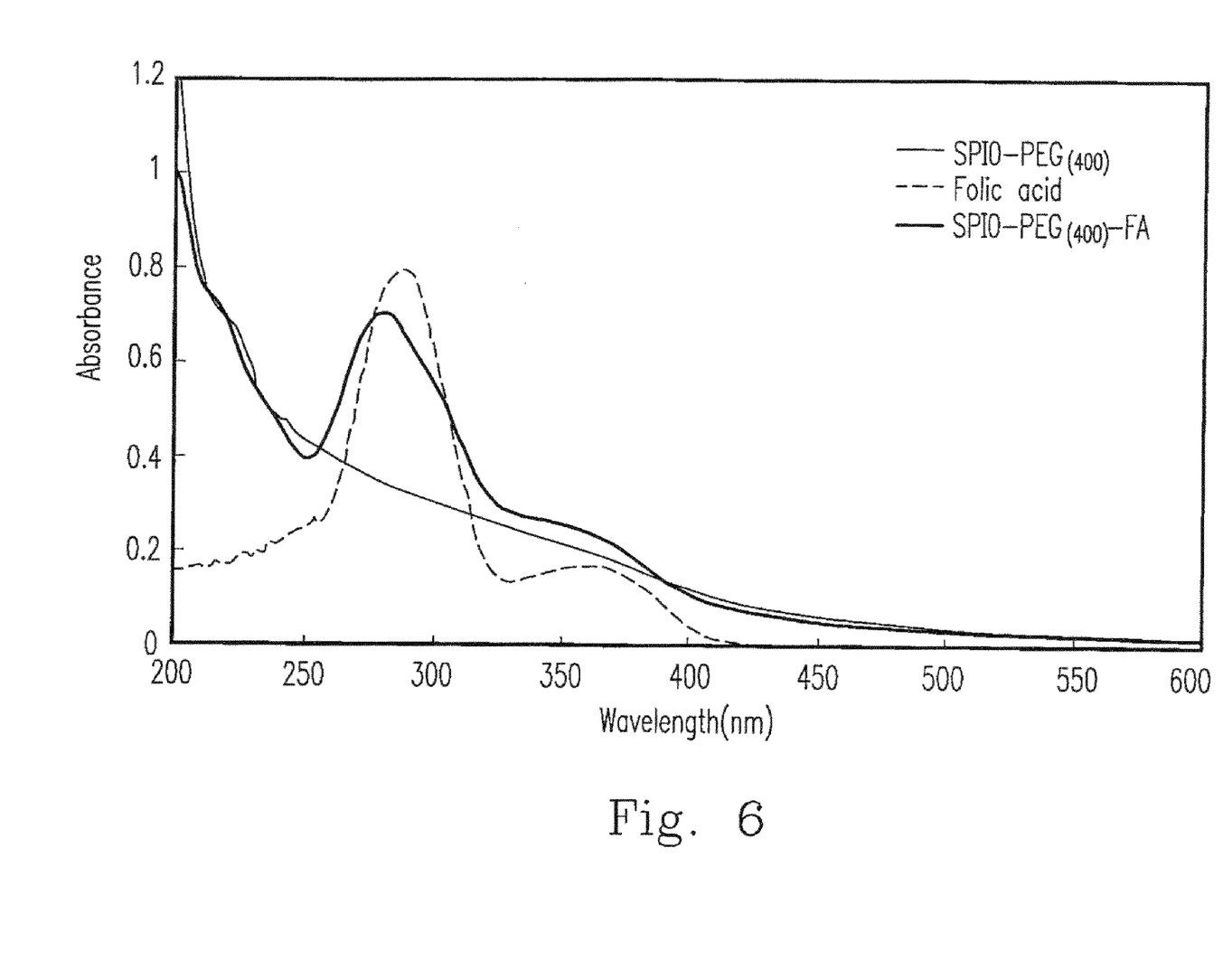
FIG. 6 is an ultraviolet spectrum diagram of the compound $PEG_{(400)}$ according to a first embodiment of the present invention.
Figure 7:
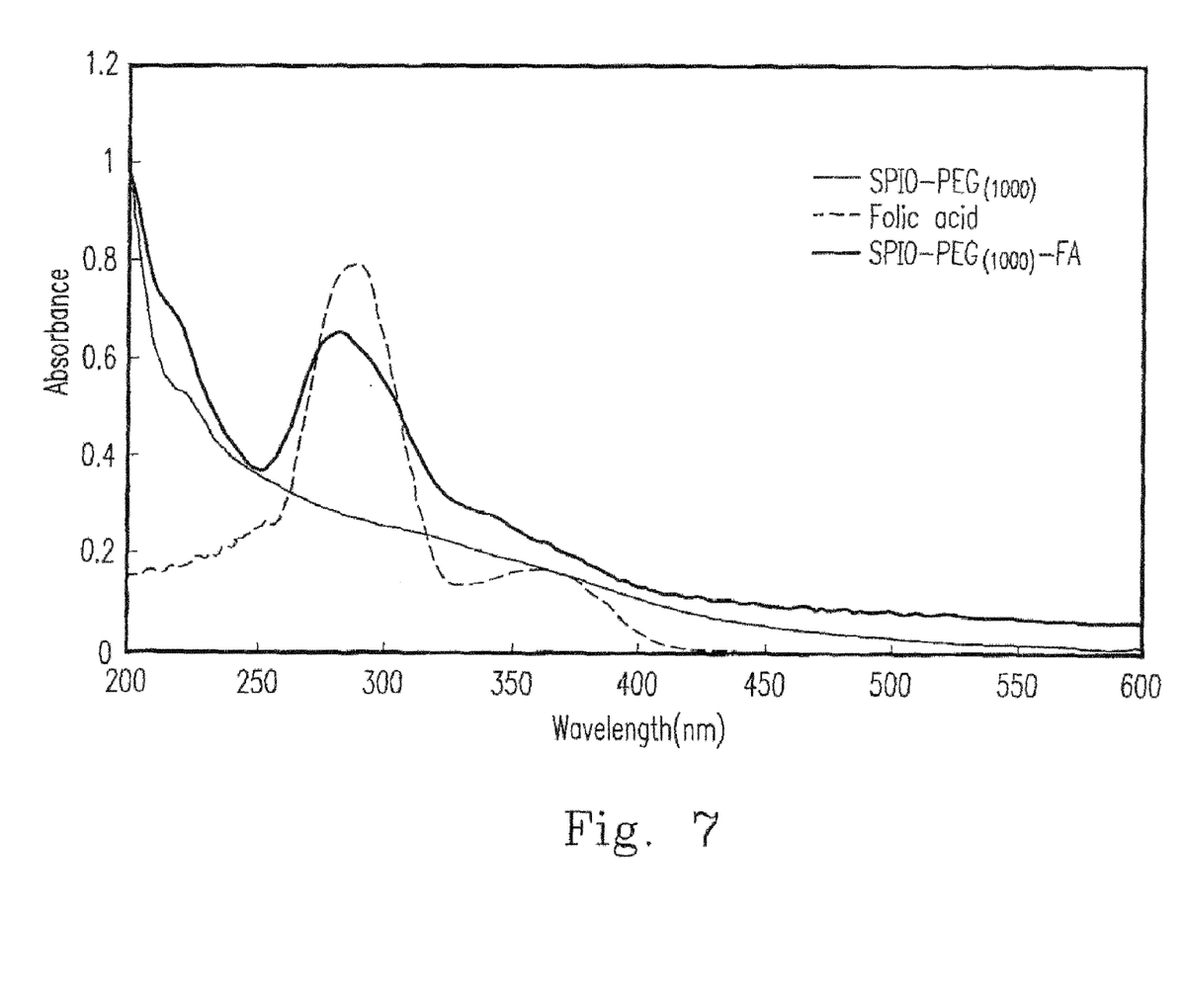
FIG. 7 is an ultraviolet spectrum diagram of the compound $PEG_{(1000)}$ according to a second embodiment of the present invention.
Figure 8:
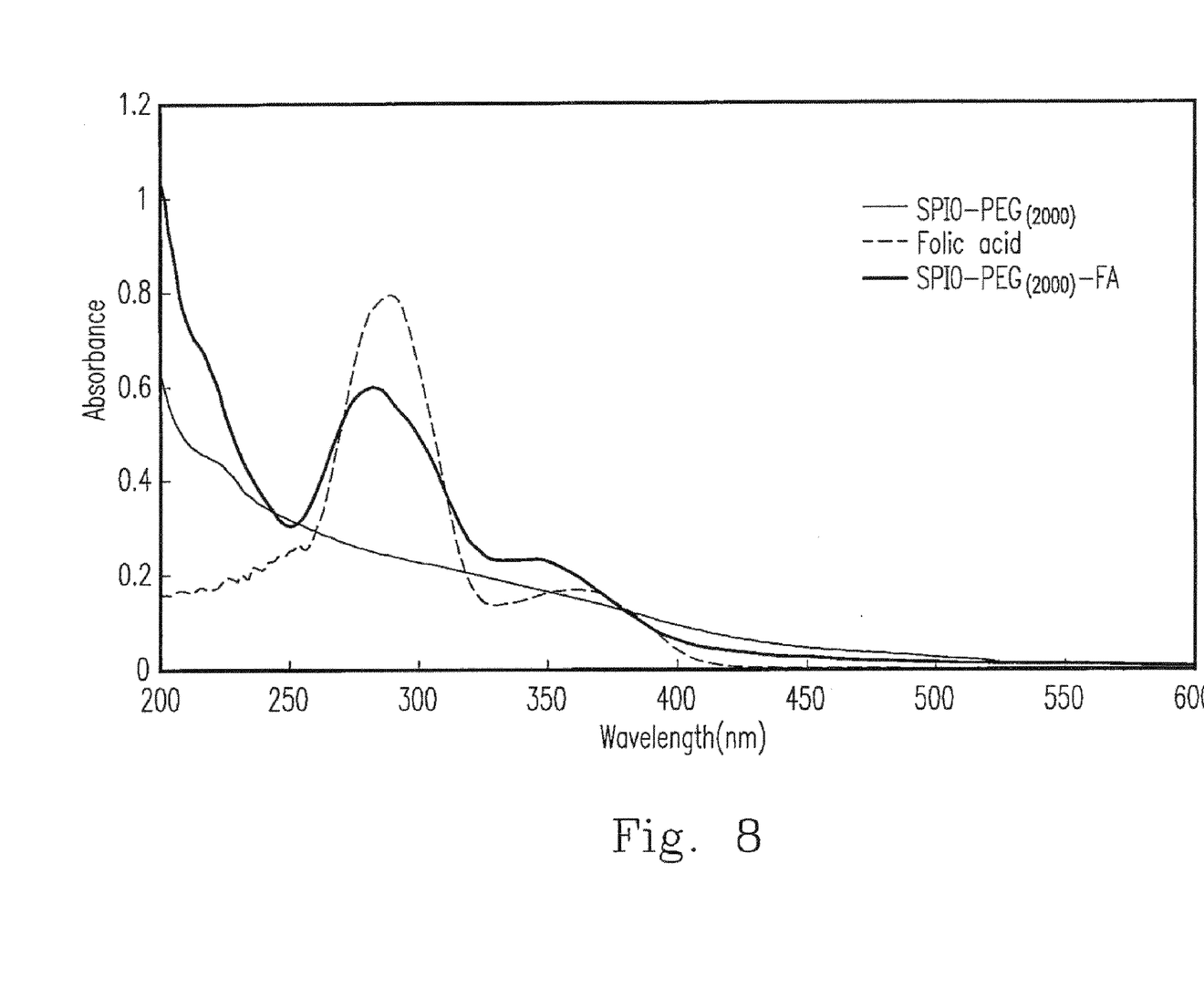
FIG. 8 is an ultraviolet spectrum diagram of the compound $PEG_{(2000)}$ according to a third embodiment of the present invention.

Please refer to FIG. 6 to FIG. 8, which depict the ultraviolet spectrum diagrams of the respective SPIO-PEG$_{(400)}$-FA, SPIO-PEG$_{(1000)}$-FA and SPIO-PEG$_{(2000)}$-FA compounds of the present invention. As illustrated in FIG. 6, the SPIO-PEG$_{(400)}$ has an apparent absorption peak at 220 nm, and the folic acid has the obvious absorption peaks at the respective 360 nm and 290 nm. As to the SPIO-PEG$_{(400)}$-FA, it has the absorption peaks at the respective 360 nm, 280 nm and 200 nm. Therefore, it is also demonstrated that the surface of the SPIO-PEG$_{(400)}$-FA has been modified with the folic acid. FIG. 7 and FIG. 8 also show the similar results to that of FIG. 6, which also demonstrates the PEG compounds with the respective 1000 and 2000 Daltons molecular weight have modified the surface of the SPIO nanoparticles and then the SPIO nanoparticles are coupled to the folic acid to form the respective SPIO-PEG$_{(1000)}$-FA and SPIO-PEG$_{(2000)}$-FA.

SPIO nanoparticles tend to aggregate to a big particle if they are not covered with the biological compatible material. After the protection with good biological compatible materials, those iron oxide nanoparticles will not aggregate, and the dispersion of SPIO will be thus increased. Through the analyzed image under the transmissible electron microscope, it is known whether those iron oxide nanoparticles are aggregated, whereby the dispersion of the present SPIO nanoparticles could be identified. Furthermore, the average diameter of the cores of those synthesized iron oxide nanoparticles is then measured and calculated.

Figure 9:
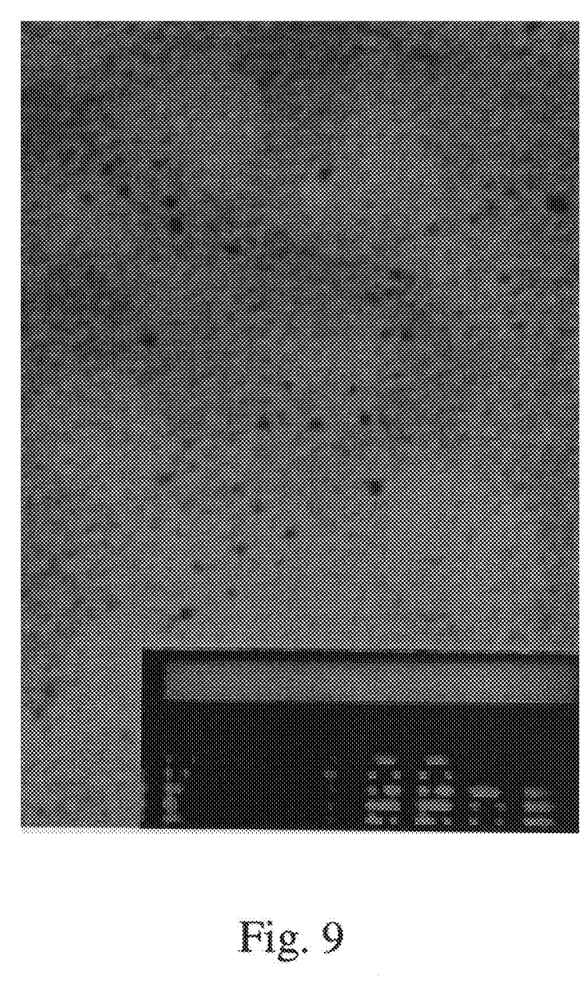
FIG. 9 is an image of the $PEG_{(400)}$ compound analyzed by the transmission electron microscope according to a first embodiment of the present invention.

Please refer to FIG. 9, which depicts the analyzed image of the SPIO-PEG$_{(400)}$-FA compound under the transmissible electron microscope of the present invention. As illustrated in FIG. 9, the average diameter of the cores of the SPIO-PEG$_{(400)}$-FA is approximately 3.8±0.8 nm, which shows a good dispersion. That is to say, it is also demonstrated that the dispersion effect will not be influenced even if the SPIO-PEG$_{(400)}$ nanoparticles are bonded to the folic acid.

Figure 10:
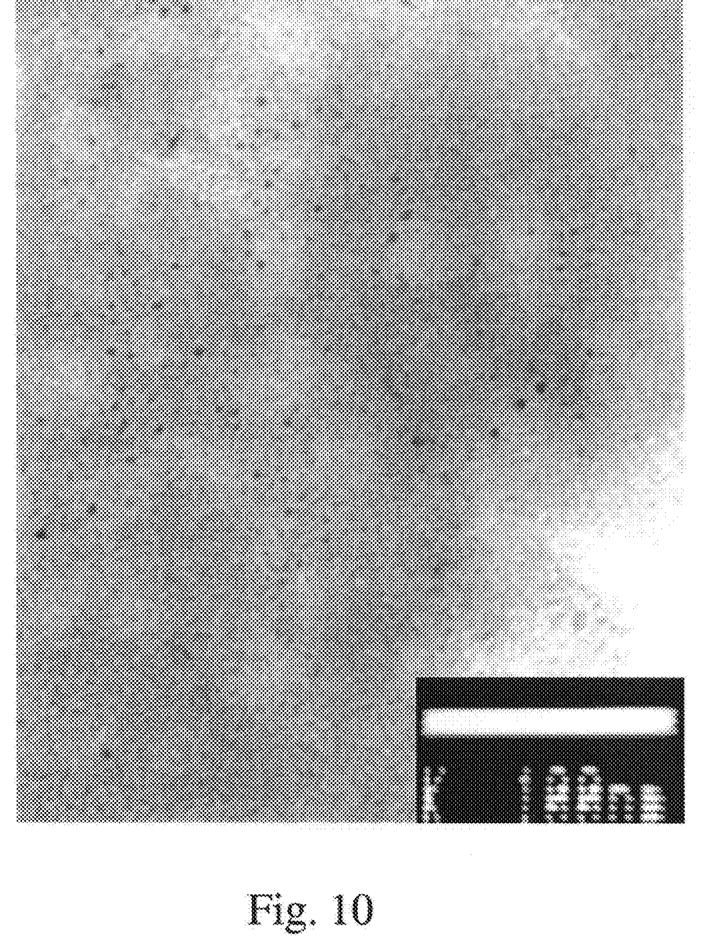
FIG. 10 is an image of the $PEG_{(1000)}$ compound analyzed by the transmission electron microscope according to a second embodiment of the present invention.
Figure 11:
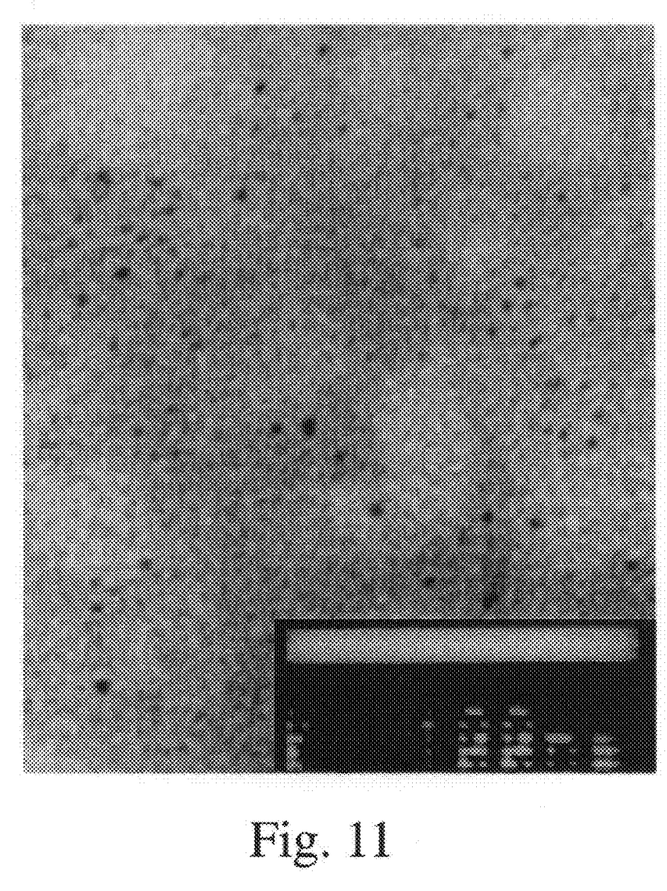
FIG. 11 is an image of the $PEG_{(2000)}$ compound analyzed by the transmission electron microscope according to a third embodiment of the present invention.

Please refer to FIG. 10 and FIG. 11, which depict the analyzed images of the respective SPIO-PEG$_{(1000)}$-FA and SPIO-PEG$_{(2000)}$-FA compounds under the transmissible electron microscope of the present invention. It is known that both of the average diameters of the cores of the respective SPIO-PEG$_{(1000)}$-FA and SPIO-PEG$_{(2000)}$-FA are approximately 3.8±0.8 nm, which are the same to that of the SPIO-PEG$_{(400)}$-FA. Therefore, the present iron oxide nanoparticles have the good dispersion.

Tumor cells are a kind of cells capable of the rapid growth. While these cells grow, they need a huge amount of DNA and RNA. The folic acid is a key factor for the synthesis of the precursor of DNA and RNA. Therefore, most tumor cells will over-express the FA receptors in their membranes. In this way, the iron oxide nanoparticles modified with the folic acid are easily capable of targeting to those membranes, so that they can entry into the tumor cells. KB cells are also a kind of tumor cells that highly over-expresses the FA receptors on their membranes, which will promote the iron oxide nanoparticles modified with the FA enter into the tumor cells.

On the other hand, the fluorescein isothiocyanate (FITC) capable of releasing the fluorescent light could be coupled to the PEG compounds as the subsequent fluorescent detection target. Therefore, the present invention provides a FITC-PEG$_{(1000)}$-FA compound used as a comparative agent against the present iron oxide nanoparticles modified with the FA. Through the detection of the flow cytometry, it is known whether the iron oxide nanoparticles modified with the FA is capable of targeting to the FA receptor.

Figure 12:
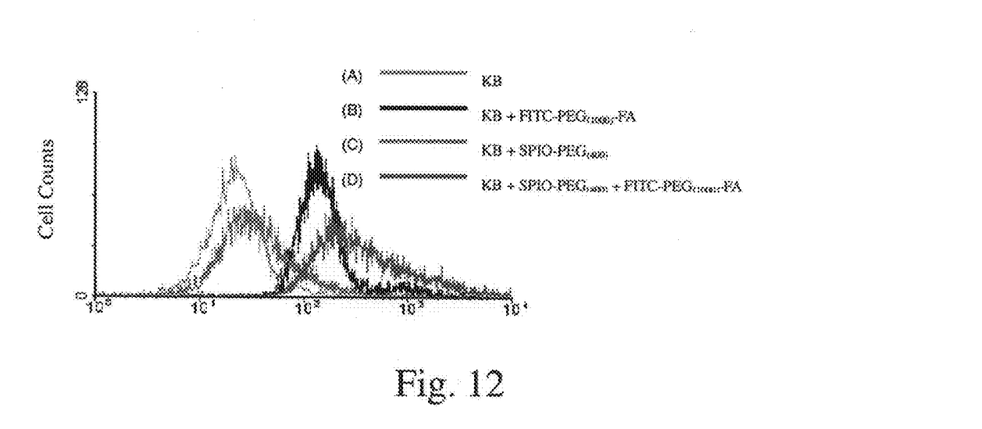
FIG. 12 is a result of the $PEG_{(400)}$ compound analyzed by the flow cytometer according to a first embodiment of the present invention.

Please refer to FIG. 12, which depicts the result of the SPIO-PEG$_{(400)}$-FA analyzed by the flow cytometer. As shown in FIG. 12, the red line represents the culture of only KB cells and the green line represents the culture of the present SPIO-PEG$_{(400)}$-FA and the KB cells where both of the analyzed results are the same without the expression of FITC signals. The black line represents the culture of the present FITC-PEG$_{(1000)}$-FA and the KB cells which show a significant fluorescent signal. The blue line represents the culture where the KB cells and the SPIO-PEG$_{(400)}$-FA are firstly developed, followed by adding the FITC-PEG$_{(400)}$-FA thereinto. Since the FA receptors existing on the KB cell membrane are initially occupied by the SPIO-PEG$_{(400)}$-FA, the following FITC-PEG$_{(1000)}$-FA fails to bind to the mentioned receptors. Therefore, the analyzed result of the present SPIO-PEG$_{(400)}$-FA and the KB cells followed by adding the FITC-PEG$_{(1000)}$-FA thereinto are consistent with that in the absence of the FITC-PEG$_{(1000)}$-FA, which shows the present SPIO-PEG$_{(400)}$-FA is capable of targeting to the FA receptor existing on the KB cell membrane.

Figure 13:
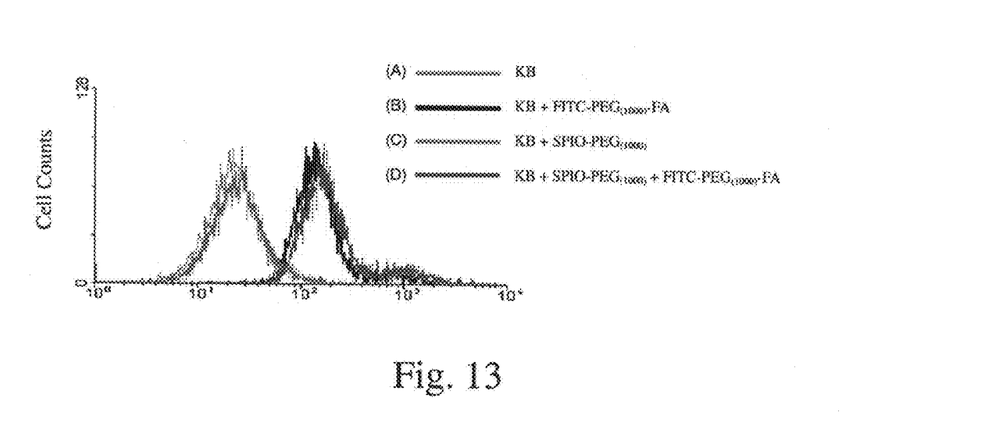
FIG. 13 is a result of the $PEG_{(1000)}$ compound analyzed by the flow cytometer according to a second embodiment of the present invention.
Figure 14:
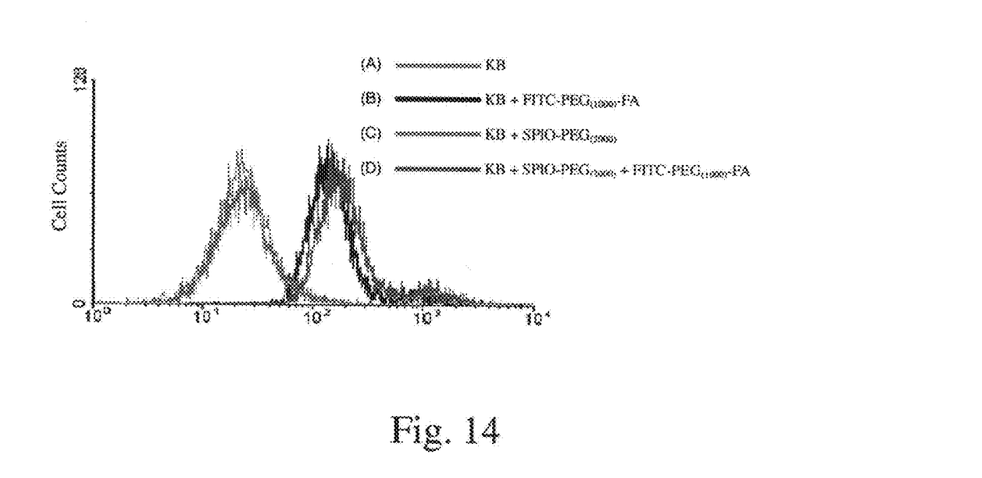
FIG. 14 is a result of the $PEG_{(2000)}$ compound analyzed by the flow cytometer according to a third embodiment of the present invention.

FIG. 13 and FIG. 14 respectively depict the result of the present SPIO-PEG$_{(1000)}$-FA and SPIO-PEG$_{(2000)}$-FA analyzed by the flow cytometer, which show the similar results to that of FIG. 12. Therefore, it is also demonstrated that the present SPIO-PEG$_{(1000)}$-FA and SPIO-PEG$_{(2000)}$-FA are capable of targeting to the FA receptors existing in the KB cell membrane.

Please refer to Table I, which shows the comparison of the relaxivity between the present embodiments and the prior art. The longitudinal relaxation time and the transverse relaxation time of the respective SPIO-PEG$_{(400)}$, SPIO-PEG$_{(1000)}$ and SPIO-PEG$_{(2000)}$ are measured through 20 MHz relaxometer at 37.0±0.1° C. It is calculated that the respective coefficient $r_1$ and $r_2$ of the SPIO-PEG$_{(400)}$ are 11.5±1.3 mM$^{-1}$s$^{-1}$ and 122.1±1.8 mM$^{-1}$s$^{-1}$, and the ratio of $r_2/r_1$ is 10.62; the respective coefficient $r_1$ and $r_2$ of the SPIO-PEG$_{(1000)}$ are 10.9±1.5 mM$^{-1}$s$^{-1}$ and 110.1±2.0 mM$^{-1}$s$^{-1}$, and the ratio of $r_2/r_1$ is 10.10; and the respective coefficient $r_1$ and $r_2$ of the SPIO-PEG$_{(2000)}$ are 12.1±1.2 mM$^{-1}$s$^{-1}$ and 104.0±1.8 mM$^{-1}$s$^{-1}$, and the ratio of $r_2/r_1$ is 8.60.

As shown in Table I, the ratio of $r_2/r_1$ of the present iron oxide nanoparticles are higher than that of Resovist. Therefore, the present SPIO-PEG$_{(400)}$-FA, SPIO-PEG$_{(1000)}$-FA and SPIO-PEG$_{(2000)}$-FA capable of targeting to FA receptors have the great potential to become the magnetic image contrast agents for targeting those cells that over-express FA receptors.

TABLE I

The longitudinal and transverse relaxation time of SPIO-PEG$_{(400)}$-FA, SPIO-PEG$_{(1000)}$-FA and SPIO-PEG$_{(2000)}$-FA measured by the 20 MHz relaxometer at 37.0 ± 0.1° C.

| iron oxide | $r_1$ (mM$^{-1}$s$^{-1}$) | $r_2$ (m$^{M-1}$s$^{-1}$) | $r_2/r_1$ |
|---|---|---|---|
| 3.8(PEG$_{(400)}$) | 11.5 ± 1.3 | 122.1 ± 1.8 | 10.62 |
| 3.8(PEG$_{(1000)}$) | 10:9 ± 1.5 | 110.1 ± 2.0 | 10.10 |
| 3.8(PEG$_{(2000)}$) | 12.1 ± 1.2 | 104.0 ± 1.8 | 8.60 |
| Resovist(dextran) | 26.2 | 169.0 | 6.46 |

In conclusion, the present invention provides the more powerful iron oxide nanoparticles as contrast agents for magnetic resonance imaging. Accordingly, the present invention can effectively solve the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for preparing a magnetic particle, comprising the steps of:
   (1) providing a superparamagnetic iron oxide nanoparticle, a folic acid, and a polyethylene glycol;
   (2) modifying the polyethylene glycol by using triethylamine and toluene-4-sulfulenyl chloride to obtain a toluene-4-sulfulenyl polyethylene glycol;
   (3) coupling the superparamagnetic iron oxide particle with the toluene-4-sulfulenyl polyethylene glycol to obtain a coupled compound; and
   (4) coupling the coupled compound with the folic acid to obtain a magnetic particle.

2. A method as claimed in claim 1, wherein the superparamagnetic iron oxide particle is prepared from reacting an iron oxide with a sodium oleate.

3. A method as claimed in claim 1, wherein the step (1) further comprises a step (1-1) of: forming an alkoxysilane on the surface of the superparamagnetic iron oxide particle.

4. A method as claimed in claim 3, wherein the alkoxysilane is a 3-(aminopropyl)triethoxy silane.

5. A method as claimed in claim 1, wherein the polyethylene glycol has an average molecular weight of 400 Daltons.

6. A method as claimed in claim 1, wherein the polyethylene glycol has an average molecular weight of 1000 Daltons.

7. A method as claimed in claim 1, wherein the polyethylene glycol has an average molecular weight of 2000 Daltons.

8. A method as claimed in claim 1, wherein the folic acid is a modified folic acid being modified by 1-ethyl-3-(3-dimethylaminopropyl)-carbodiimide and N'-hydroxy succinimide.

9. A magnetic particle produced by the method as claimed in claim 1.

10. A magnetic particle as claimed in claim 9, wherein the magnetic particle is used as a contrast agent for magnetic resonance imaging.

* * * * *